United States Patent [19]

Leuenberger et al.

[11] 4,084,160
[45] Apr. 11, 1978

[54] ARRANGEMENT FOR CORRECTING DEVIATIONS FROM THE TRUE BEARING CAUSED BY REFLECTING SURFACES IN TARGET TRACKING RADAR INSTALLATIONS

[75] Inventors: Urs Leuenberger, Bonstetten; Albert Schenkel, Oberengstringen, both of Switzerland

[73] Assignee: Siemens-Albis Aktiengesellschaft, Zurich, Switzerland

[21] Appl. No.: 682,019

[22] Filed: Apr. 30, 1976

[30] Foreign Application Priority Data

May 22, 1975 Switzerland .................. 6587/75

[51] Int. Cl.² .............................................. G01S 3/80
[52] U.S. Cl. ................................ 343/16 M; 343/114.5
[58] Field of Search ............. 343/16 M, 16 LS, 16 R, 343/114, 114.5

[56] References Cited

U.S. PATENT DOCUMENTS

| 3,090,951 | 5/1963 | Mieher .................. 343/16 M |
| 3,309,701 | 3/1967 | Bollinger et al. ........... 343/16 M |
| 3,821,738 | 6/1974 | Quesinberry et al. ......... 343/16 M |
| 3,971,027 | 7/1976 | Alcock et al. ............. 343/114 |

FOREIGN PATENT DOCUMENTS 1,402,711   8/1975   United Kingdom ............. 343/16 M Primary Examiner—S. C. Buczinski
Attorney, Agent, or Firm—Werner W. Kleeman

[57] ABSTRACT

An arrangement for correcting deviations from the true bearing due to the effects of specular reflecting surfaces in target tracking radar installations having at least three primary feeds. At least two of the primary feeds are aligned such that a plane formed by the longitudinal axes of their radiation characteristics is disposed at least approximately perpendicular to the specular reflecting surface. At least one further primary feed is arranged such that the longitudinal axis of its radiation characteristic is located externally of such plane. A summation-difference network produces from the echo signals received by the primary feeds, apart from a summation signal, also two difference signals, and a cross-term signal formed in at least one measurement interval. From these signals there is produced an angle error signal which is divided into two components. In a signal processing stage there is obtained a correction signal in order to correct the angle error signal falsified by the specular reflection effects.

3 Claims, 7 Drawing Figures

Fig: 2b

ARRANGEMENT FOR CORRECTING DEVIATIONS FROM THE TRUE BEARING CAUSED BY REFLECTING SURFACES IN TARGET TRACKING RADAR INSTALLATIONS

BACKGROUND OF THE INVENTION

The present invention relates to a new and improved arrangement for correcting deviations from the true bearing brought about by specular reflecting surfaces in target tracking radar installations of the type equipped with at least three primary feeds or energy radiating elements.

During the operation of radar installations it is known that apart from the useful signal there are present a multiplicity of undesired echo signals, for instance due to reflection from the ground or water, elevations in terrain, atmospheric and tropospheric layers and so forth. Especially in the case of mobile target tracking radar installations due to their particular concept of intended use and their function of continuously measuring the target, oftentimes changing reflection disturbances occur mostly in all three coordinates and for target speed-determination under different topographical conditions. Depending upon the nature of the target tracking radar installation such also additionally encompasses the function of target detection, so that the radar beam-search movement required for this purpose and accommodated to the terrain automatically arrives at the region of reflecting media and therefore this mode of operation is particularly prone to disturbances.

The suppression of echo signals which emanate from stationary reflectors occurs extensively by means of a so-called moving target indicator with the aid of, for instance, Doppler processing or delay lines and so forth.

On the other hand, suppression of an echo signal is much more difficult in the case of the glancing incidence of a radar beam at a surface designated as a specular reflecting surface which is flat or planar in respect to the wavelength of the transmitted microwave beam. In this case there are formed two wave trains which mutually interfere and at least partially falsify the target echo signal to be processed. The first wave train constitutes the wave directly reflected by the target, whereas the second wave train constitutes a wave reflected by the specular reflecting surface and having a phase shift which is a function of the reflecting media. Hence, at the receiver elements there are formed fields with different field vectors depending upon the momentary relative phase position of the incoming wave trains, these field vectors being additive to one another and influencing the relevant signal removed at the receiver element.

The above observation of the phenomenon known as the specular reflecting effect or mirror effect becomes, however, more significant if the specular reflecting surface is assumed to be a diffuse reflector, such as for instance a moving ocean, irregular rocks or a surface-profiled manoeuvring area. Also the curvature of the earth, depending upon the shape of the lobe-like radiation characteristic of the radar antenna and the elevation of the radar target, especially over specular reflecting water surfaces, has an additional effect upon the falsification of the target echo signal. Of course, the described conditions can be applied also to radar techniques employing different wave shapes in a corresponding modified form and are equally applicable particularly in the case of monopulse radar systems.

In German patent publication No. 2,341,312 there are mentioned numerous methods and apparatuses for suppressing ground echoes. As a novel version there is proposed a radar installation embodying an amplifier loop for improving the ratio between the spurious signal to useful signal, the amplifier loop being effective during a receiving time interval between the cycles of two pulses. With the aid of a synchronization device, power divider and coupler a predetermined radiation pattern properly controlled as a function of time is radiated from a transmitter-receiver arrangement. By stepwise switching antenna devices it is intended to influence the receiving direction, and the echo signal emanating from the target as amplified in contrast to the ground echo.

These state-of-the-art radar installations at best afford a specular reflection effect suppression and due to the physical prerequisites can be considered as an optimum solution of conventional techniques. Furthermore, that invention only can be employed with great technological expenditure, also in the environment of target tracking radar installations.

A further improved possibility suitable for target tracking radar installations for the reduction of the specular reflection effect has been published by M. D. Symonds and J. M. Smith in their report entitled "Multi-Frequency Complex-Angle Tracking of Low-Level Targets", IEEE Conference Publication London, October 1973, pp. 166–171. The phase angle which is likewise constant or only varies slowly with constant transmission frequency —the phase angle between the direct signal portion and the reflected signal portion— is likewise varied by a variable transmitting frequency. Thus, by means of the evaluation of complex phase angles appearing in the echo signals there can be realized a considerable reduction of the deviation from the true bearing of the radar device brought about by the specular reflection effects.

As is however known from the technique of frequency agility rapid changes of the transmission frequency are associated with a relatively large expenditure. Additionally, the present day technology in radar transmitters only permits of the desired large frequency shift needed for obtaining favorable phase differences at the expense of considerable technological difficulties.

All of the heretofore known methods are furthermore associated with the drawback that the measures needed for correction of the reflect effect must be carried out in each successive measurement interval.

SUMMARY OF THE INVENTION

Hence, it is a primary object of the present invention to provide an improved apparatus for correcting the specular reflection effects in target tracking radar installations in a manner not associated with the aforementioned drawbacks and limitations.

Another and more specific object of the present invention is concerned with a new and improved apparatus for correcting deviations from the true bearing in target tracking radar installations, which deviations are brought about by specular reflecting surfaces, wherein the indicated disadvantages of the prior art techniques and equipment are not present.

Still another object of the present invention is to eliminate intentional or natural disturbance sources having a characteristic similar to the reflection echo, and to render possible a disturbance-free transition to the specular reflection effect-free operational mode.

Yet a further object is to provide an arrangement of the character described which can be employed for different radar systems and without any expensive and complicated changes also can be integrated into already existing installations.

Now in order to implement these and still further objects of the invention, which will become more readily apparent as the description proceeds, the arrangement of the invention for correcting deviations from the true bearing due to the specular effects of reflecting surfaces in target tracking radar installations having at least three primary feeds is manifested by the features that at least two of the primary feeds are aligned such that a plane formed by the longitudinal axes of their radiation characteristics is disposed at least approximately perpendicular to the specular reflecting surface, and at least one further primary feed is arranged such that the longitudinal axis of its radiation characteristic is located externally of such plane. A summation-difference network produces from the echo signal received by the primary feeds, apart from a summation signal, also two difference signals and an additional cross-term signal formed in at least one measurement interval. From these signals there is produced a corrected angle error signal $F_E$ which is divided into two components. In a signal processing stage there is obtained a correction signal $F_A$ in order to correct the angle error signal $E_{EP}$ falsified by the reflection $F_E(X_1) = E_{EP} + F_A$ effects, the correction signal being expressed by the following equation:

$$F_A = -E_{EQ}/E_{KQ} E_{KP} + F_{AR}$$

wherein $E_{EP}$ = the known elevation angle error signal part falsified by the specular reflection effect and in phase with the summation signal;

$E_{EQ}$ = the known elevation angle error signal part falsified by the specular reflection effect and in quadrature to the summation signal;

$E_{KP}$ = the elevation angle error signal part in phase with the summation signal and obtained according to the invention from the cross-term function;

$E_{KQ}$ = the elevation angle error signal part in quadrature to the summation signal and obtained from the cross-term function according to the invention;

$F_{AR}$ = residual correction signal.

The elevational angle plane or elevation plane constitutes a plane which is orthogonal to the specular reflecting surface. Accordingly, all elevational angles to be measured are located in this elevation plane, but they can be located in random position to the geodetic elevational angle. Of course, analogous observations are also true for the azimuth.

The expression "the cross-term function" characterizes a known although not previously evaluated difference function which can be obtained by likewise known waveguide arrangements between two diagonal or, in special instances, also quasidiagonal oppositely situated primary feeds.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2b illustrates an antenna arrangement having six primary feeds and aligned for correcting the specular reflection effect;

DETAILED DESCRIPTION OF THE PREFERRED EMBODIMENTS

Figure 1:
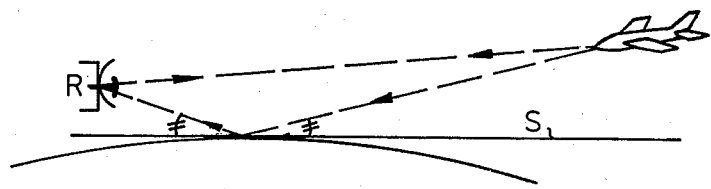
FIG. 1 schematically illustrates a radar installation arranged near a specular reflecting surface during the tracking of a low flying aircraft.

Referring now to FIG. 1 there is portrayed therein a radar measurement operation occurring over a specular reflecting surface S, for instance a smooth water surface. In order to simplify matters the specular reflecting surface S has been assumed to be a tangential surface with respect to the sphere of the earth. The lobe-shaped radiation characteristic of the radar antenna, the bearing angle relative to the radar target as well as the reflection characteristic of the radar target and the effects caused by the side lobes have not been illustrated.

Figure 2:
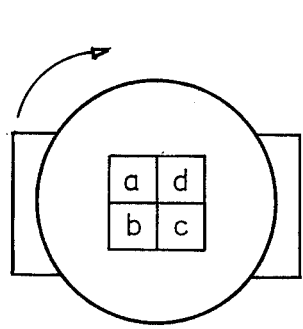
FIG. 2 illustrates a radar device having a rotatable monopulse antenna.
Figure 2A:
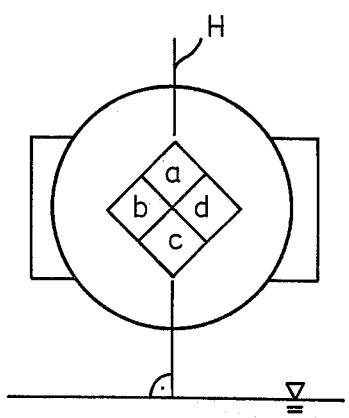
FIG. 2a illustrates the monopulse antenna aligned for correction of the specular reflection effect.
Figure 2C:
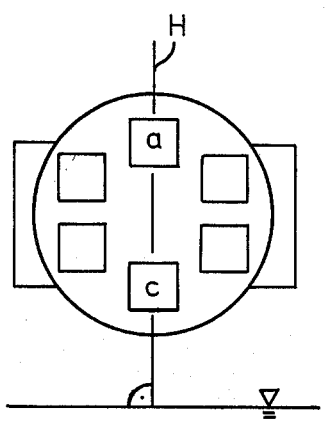
FIG. 2c illustrates an antenna arrangement having three primary feeds and aligned for correcting the specular reflection effect.
Figure 2C:
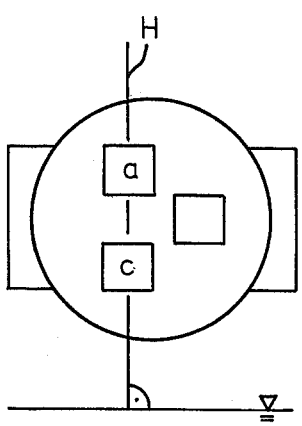

In FIGS. 2a, 2b and 2c there are illustrated different antenna configurations as well as their alignment by means of an (imaginary) elevational plane which is orthogonal to the specular reflecting surface. The generally valid principle of alignment of an antenna will be demonstrated by way of example in conjunction with an antenna which is rather seldom realized in practice and having three primary feeds (FIG. 2c).

Figure 3:
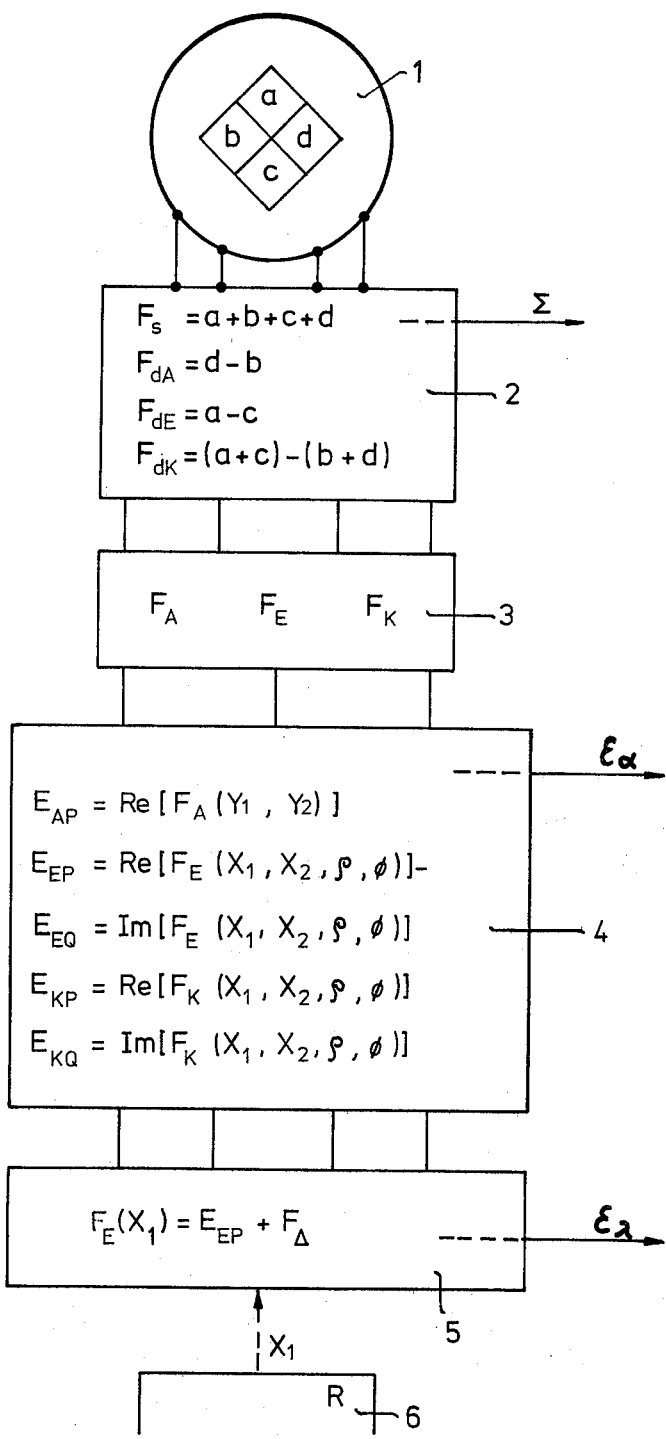
FIG. 3 schematically illustrates a block circuit diagram of part of a radar installation illustrating a signal feed typical for the correction of the specular reflection effect.

The target tracking radar installation of FIG. 3 incorporates a monopulse antenna 1 which is aligned as contemplated by the invention and having the primary feeds a, b, c and d. Connected thereafter is a summation-difference network 2 followed by a discriminator 3. The outputs of the discriminator 3 are connected with a signal processing stage 4, and the outputs of such signal processing stage 4 are connected with a correction circuit 5. If necessary a computer 6 can be connected with the correction circuit 5.

The mode of operation of the invention can be explained without having to take into consideration the specific technique of the relevant radar system.

The monopulse antenna 1 receives interference signals consisting of the direct and reflected echo signals. Due to the alignment with respect to the specular reflecting surface it is possible to obtain in the summation-difference network 2 in conventional manner from the echo signals received by the primary feeds a, b, c and d, the following useful signals: A summation function containing the distance information and expressed as follows:

$$F_S = a + b + c + d$$

A first difference function containing the azimuth information, which can be expressed as follows:

$$F_{dA} = d - b$$

A second difference function falsified by the specular reflection effect and containing the elevation information and the specular reflection effect information, and expressed by the following equation:

$$F_{dE} = a - c$$

And a cross-term function containing both angle deviation information and the specular reflection effect information and expressed as follows:

$$F_{dK} = (a+c) - (b+d)$$

The summation-difference network 2 delivers the summation function $F_s$ in the form of a summation signal $\Sigma$ and after conversion to an intermediate frequency is employed directly in a known manner as the distance information.

In the discriminator 3 there are also formed in a conventional manner the angle error functions, namely:

the azimuth $F_A = F_{dA}/F_S$ the elevation $F_E = F_{dE}/F_S$ the cross-term $F_K = F_{dK}/F_S$.

In the subsequent signal processing stage 4, while using conventional techniques, there are obtained the following signals: From the angle error function $F_A$ of the angle error signal of the azimuth $E_{AP} = \text{Re}\,[F_A(Y_1,Y_2)]$ and after adjusting the radar antenna in azimuth by means of the azimuth information $E_{AP}$ there is likewise obtained the following:

from the angle error function $F_E$ of the angle error signal of the elevational angle $$E_{EP} = \text{Re}\,[F_E(X_1,X_2,\rho,\phi)]$$

the 90° phase shifted error signal of the elevational angle $$E_{EQ} = \text{Im}\,[F_E(X_1,X_2,\rho,\phi)]$$

as well as from the angle error function $F_K$ of the angle error signal the cross term $$E_{KP} = \text{Re}\,[F_K(X_1,X_2,\rho,\phi)]$$

and the 90° phase shifted cross-term $$E_{KQ} = \text{Im}\,[F_K(X_1,X_2,\rho,\phi)]$$

For all of the angle error signals there is valid the summation function and a signal corresponding thereto from the summation channel as the phase reference. The 90° phase shifted angle error signals are advantageously generated by quadrature channels.

Figure 4:
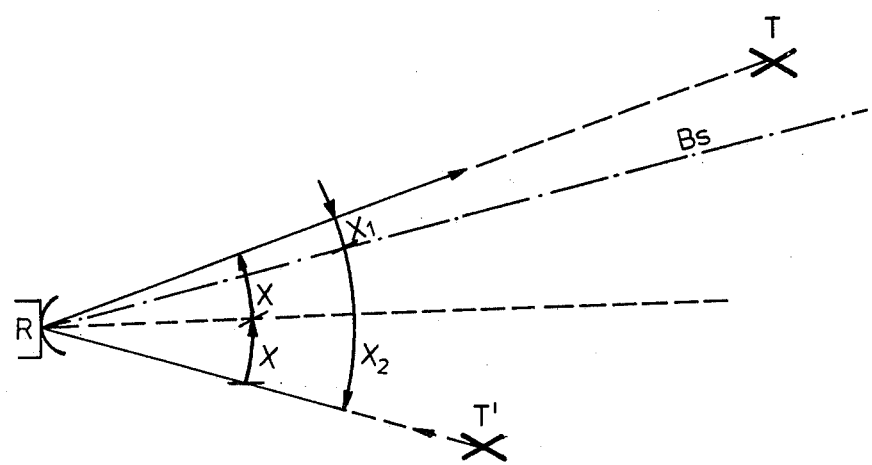
FIG. 4 illustrates the angle relationships in the elevational plane with an actual radar target T and a reflected radar target T' for a given foresight alignment of the radar device R.

Further, in the above equations the following symbols designate the following:

Re = Real part;
Im = Imaginary part;
$X_1, X_2$ = Angle in relation to the boresight in the elevational angle plane (FIG. 4);

$Y_1, Y_2$ = Angle analogous to $X_1, X_2$ in the azimuth plane (not illustrated);

$\rho$ = Degree of reflection of the radar beam impinging at the specular reflecting surface and reflected back by the target;

$\phi$ = Phase angle between the reflected and direct signal portions.

The mode of operation of the correction circuit 5 following the signal processing stage 4 can be explained by the evaluation of both angle error functions $F_E(X)$ and $F_K(X)$ (see FIG. 4). The angle error function $F_E(X)$ is thus represented by the complex angle error signal $E_E$, equally the further angle error function $F_K(X)$ by the complex angle error signal $E_K$.

There are valid the following equations:

$$E_E = \frac{F_E(X_1) + R \cdot F_E(X_2) \cdot e^{i\phi}}{1 + R \cdot e^{i\phi}}$$

$$E_K = \frac{F_K(X_1) + R \cdot F_K(X_2) e^{i\phi}}{1 + R \cdot e^{i\phi}}$$

wherein
R = auxiliary magnitude defined as
$R = \rho \cdot F_S(X_2)/F_S(X_1)$

The complex angle error signals $E_E$ and $E_K$ can be divided as is known into a real part and an imaginary part:

Real Part (in phase to summation channel)

$$E_{EP} = \frac{F_E(X_1) + R \cdot \cos\phi [F_E(X_1) + F_E(X_2)] + R^2 \cdot F_E(X_2)}{1 + 2R \cdot \cos\phi + R^2}$$

$$E_{KP} = \frac{F_K(X_1) + R \cdot \cos\phi [F_K(X_1) + F_K(X_2)] + R^2 \cdot F_K(X_2)}{1 + 2R \cdot \cos\phi + R^2}$$

Imaginary Part (in quadrature to summation channel)

$$E_{EQ} = \frac{[F_E(X_2) - F_E(X_1)] R \cdot \sin\phi}{1 + 2R \cdot \cos\phi + R^2}$$

$$E_{KQ} = \frac{[F_K(X_2) - F_K(X_1)] R \cdot \sin\phi}{1 + 2R \cdot \cos\phi + R^2}$$

so that by an obvious algebraic transformation an exact conditional equation for the angle error signal can be obtained $$F_E(X_1) = E_{EP} - \frac{E_{EQ}}{E_{KQ}} E_{KP} + \frac{E_{EQ}}{E_{KQ}} F_K(X_1) =$$

$$E_{EP} - F_{\Delta 1} + F_{\Delta R}$$

Since the residual correction element $F_{\Delta R} = E_{EQ}/E_{KQ} F_K(X_1)$ like the angle error signal itself is a function of $X_1$, the momentary target deviations must be at least approximately known; for the iterative determination, i.e., successive approximation of the residual correction element from this target deviation data there is utilized the computer R which can be selectively connected with the radar device.

In most cases it is possible to dispense with the residual correction element $F_{\Delta R}$, since with the correction element $F_{A1}$ a sufficient approximation can be obtained over a wide angle range. The residual correction element $F_{A1}$ becomes null with exact target alignment, i.e. when the boresight Bs is aligned with the target T (FIG. 4), since $F_K(X_1) = 0$ for $X_1 = 0$.

The inventive solution has, among other things, the advantage that the determination of the correction element $F_{A1}$ and the residual correction element $F_{AR}$ can take place in one or an arbitrary number of measurement intervals. This allows the realization of a multiplicity of known simple correction circuits accommodated to the momentary employed radar technique.

The illustrated method for the correction of a deviation from the true bearing brought about by specular reflecting surfaces in target tracking radar installations is predicated upon the concept that by aligning an antenna arrangement there can be obtained measurement data for the correction of such deviation and such data is evaluated. Hence, it therefore appears obvious to designate the present invention, with appropriately accommodated evaluation method, based upon the mathematical relationships, also as an elimination method and to employ such for the complete elimination of the specular reflection effect.

While there are shown and described present preferred embodiments of the invention, it is to be distinctly understood that the invention is not limited thereto, but may be otherwise variously embodied and practiced within the scope of the following claims. Accordingly,

What is claimed is:

1. An arrangement for correcting deviations from the true bearing due to the effects of specular reflecting surfaces in target tracking radar installations comprising at least three primary feeds, at least two of said primary feeds being aligned such that a plane formed by the longitudinal axes of their radiation characteristics is disposed at least approximately perpendicular to the specular reflecting surface, and at least one further primary feed is arranged such that the longitudinal axis of its radiation characteristic is located externally of such plane, a summation-difference network which produces from the echo signals received by the primary feeds a summation signal, two difference signals, and a cross-term signal formed in at least one measurement interval, means for forming a corrected angle error signal $F_e$ from these signals and which angle signal is divided into two components, a signal processing stage for forming a correction signal $F_A$ in order to correct the angle error signal $E_{EP}$ falsified by the reflection effects $$F_E(X_1) = E_{EP} + F_A$$

the correction signal $F_A$ being expressed by the following equation $$F_A = -E_{EQ}/E_{KQ} E_{KP} + F_{AR}$$

wherein
$E_{EP}$ = the angle error signal portion falsified by specular reflection effects and in phase with the summation signal;
$E_{EQ}$ = the angle error signal falsified by the specular reflection effects and in quadrature to the summation signal;
$E_{KP}$ = the angle error signal portion obtained from the cross-term function and in phase with the summation signal;
$E_{KQ}$ = the angle error signal portion obtained from the cross-term function and in quadrature to the summation signal;
$F_{AR}$ = residual correction signal; and
$F_E(X_1)$ = the angle error signal after correction.

2. The arrangement as defined in claim 1, further including means for carrying out an iteration step for determining an improved angle error signal $F_E(X_1)$ from the equation $$F_E(X_1) = E_{EP} - E_{EQ}/E_{KQ} E_{KP} + F_{AR}$$

starting with $F_{AR} = 0$ in the first step and recursively improving the residual correction $F_{AR}$ according to the actual estimate found for $X_1$.

3. The arrangement as defined in claim 2, wherein the signal processing stage yields the residual correction signal $F_{AR}$ according to the following equation:

$$F_{AR} = E_{EQ}/E_{KQ} F_K(X_1)$$

wherein $F_K(X_1)$ constitutes the error function of the cross-term signal for the approximate angle $X_1$, formed between the radar boresight and the radar target axis and which is derived from the preceding iteration steps.

* * * * *